May 9, 1939.  J. BELLIS  2,157,472
GOVERNOR FOR AUTOMOTIVE VEHICLES
Filed May 6, 1935  2 Sheets-Sheet 1
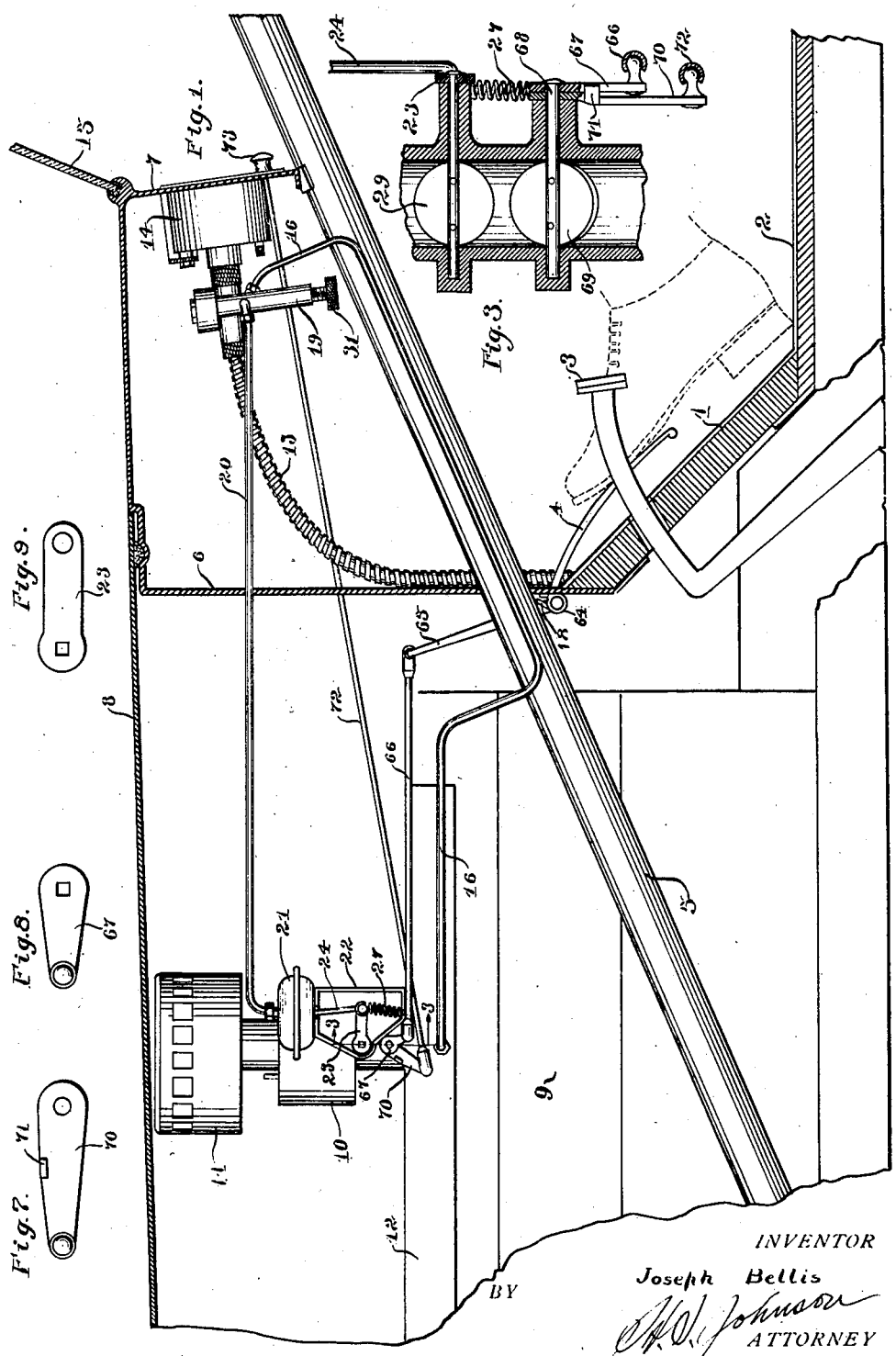
INVENTOR
Joseph Bellis
BY
ATTORNEY

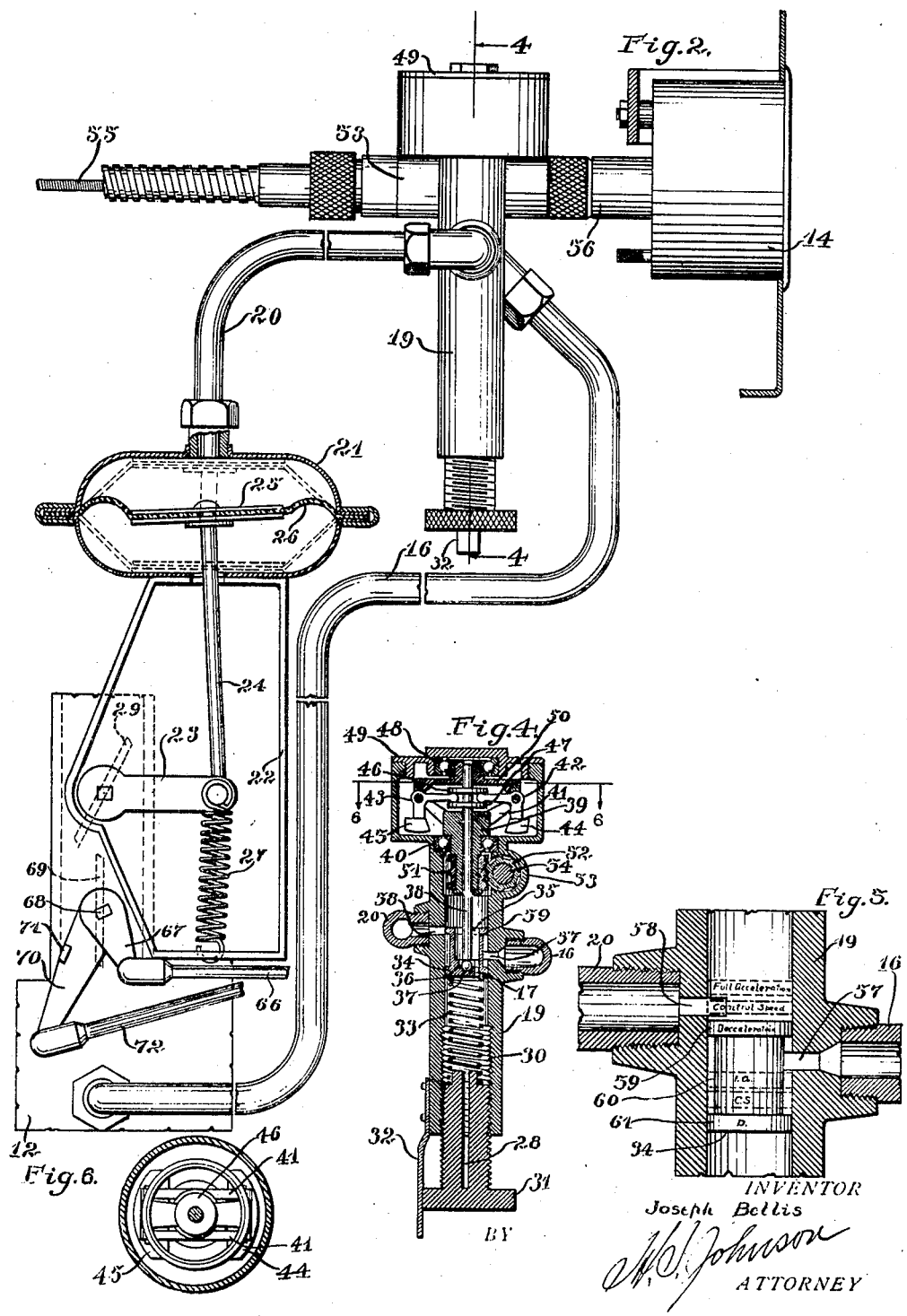

Patented May 9, 1939

2,157,472

UNITED STATES PATENT OFFICE 2,157,472

GOVERNOR FOR AUTOMOTIVE VEHICLES

Joseph Bellis, St. Paul, Minn.

Application May 6, 1935, Serial No. 19,927

2 Claims. (Cl. 137—140)

The present invention relates to a governor for internal combustion motors.

The invention, while complete in itself, was designed and is particularly adapted for use with carburetor control mechanisms such as are shown in my co-pending applications, Serial No. 672,151, now Patent No. 2,066,667, and Serial Number 690,876, now Patent 2,116,556.

In driving an automobile, particularly where comparatively long stretches of open country driving are encountered, it is desirable to be able to set the car at an adjusted speed and thus eliminate the necessity for constantly holding the foot throttle in adjusted position. This is desirable from the standpoint of economy as well as of the driver's comfort, since constant jogging of the foot accelerator, due to the motion of the car, has a tendency to waste gas and the holding of the foot in the same position for long periods of time is extremely tiring and uncomfortable.

An object of the present invention is to make an improved and simplified governor for an automotive power plant.

Another object is to make an improved and simplified adjustable governor for an automotive plant, which combines mechanical motion and differential pressures generated by the power plant.

Another object is to make an improved and simplified governor for automotive power plants which may be readily controlled from the driver's seat of an automotive vehicle.

In order to attain these objects, there is provided, in accordance with one feature of the invention, an element actuated by fluid pressure connected to a carburetor control member, the fluid pressure actuated element being maintained in a state of adjusted equilibrium when the automotive vehicle upon which the device is mounted attains a predetermined speed, by a mechanically operated valve mechanism actuated by a device moving at a speed proportionate to the speed of the automotive vehicle upon which the device is mounted.

These and other features of the invention will be more fully brought out in the following description and the accompanying drawings, wherein:

Figure 1 is a general assembly view, in side elevation, of a device embodying the present invention mounted on an automobile, the automobile being shown partly in section and only those parts illustrated necessary to the mounting of the device embodying the present invention and its associated parts.

Figure 2 is a somewhat schematic view in side elevation of the component parts of the present invention, portions thereof being broken away to disclose their structure.

Figure 3 is a vertical, sectional view on the line 3—3 of Figure 1, showing a throttle valve and a governor controlled valve and associated parts.

Figure 4 is a sectional view on the line 4—4 of Figure 2.

Figure 5 is an enlarged, sectional view through a valve mechanism embodied in the governor shown in Figure 4, a movable valve element being shown in one position in solid lines and in two other positions in dotted lines.

Figure 6 is a sectional view on the line 7—7 of Figure 4, a cover of a governor spider being removed to more clearly illustrate the structure of the device.

Figure 7 is a plan view of a manually operated carburetor control arm.

Figure 8 is a similar view of a foot operated carburetor control arm; and

Figure 9 is a similar view of a governor operated carburetor control arm.

Referring to the drawings in detail, the parts of an automobile shown in Figure 1, comprise floor boards 1 and 2, a clutch pedal 3, an accelerator pedal 4, a steering post 5, a dash 6, an instrument panel 7, a hood 8, a motor 9, a carburetor 10, an air-cleaner 11, an intake manifold 12, a speedometer drive shaft housing 13, a speedometer 14, and a windshield 15. These are all standard automobile parts and, therefore, require no detailed description for those skilled in the art. A pipe 16 is tapped into the intake manifold 12 and is carried up along the steering post 5 and thence to one side of a governor housing 19. From the other side of the governor housing a pipe 20 is connected into the upper half of a diaphragm housing 21 which is mounted on a bracket 22 above a carburetor control arm 23.

One end of a rod 24 is connected to a plate 25 mounted on a flexible diaphragm 26 within the housing 21, see Figure 2, the other end of the rod 24 being pivotally connected to the carburetor control arm 23. The lower end of the rod 24 is connected to a coil tension spring 27, the lower end of which is secured to the bracket 22. The raising of the rod 24 by an upward movement of the plate 25 by the action of the diaphragm 26 will tend to move the carburetor control arm 23 in a counter-clockwise direction, as illustrated in Figures 1 and 2, thereby moving a carburetor valve 29 to which this arm 23 is fixedly connected (see Figure 3) toward an open position.

The structure of a governor controlled valve mechanism, best illustrated in Figures 2, 4, and 5, comprises the casing 19 having an internally threaded opening 30 in the lower end thereof.

A threaded adjusting screw 31 is threadedly mounted in the opening 30 and a spring arm 32 is mounted on the casing 19 and extends downwardly to resiliently engage a knurled head portion of the adjusting screw 31 to hold it in adjusted position. The adjusting screw 31 is slotted lengthwise as at 28 throughout its entire threaded length to admit air at atmospheric pressure to the interior of the governor casing 19. A compressor spring 33 is mounted within the casing 19 and is held in compression between the upper end of the adjusting screw 31 and a slidable valve piston 34. The valve piston 34 is provided with a recessed upper portion 35, having a smaller depression 36 at the lower end thereof. In this smaller depression a steel ball 37 is mounted and upon this steel ball the stem 38 of a governor mechanism is rotatably supported. An opening 17 is drilled through the piston at one side of the depression 36 to permit a flow of air through the piston. The stem 38 is slidably mounted in a governor head 39, which is rotatably supported on a ball bearing 40 mounted in the casing 19, and a second ball bearing 48 mounted in a cap member 49 threadedly mounted in the enlarged upper portion of the governor casing 19. The governor head 39 has a spider 41 (see Figure 7) projecting outwardly from the upper end thereof, and on opposite sides of the spider 41 are pivotally supported weighted governor arms 42 and 43. The governor arms 42 and 43 each have small weighted portions 44 and 45, respectively, at the lower ends of the downwardly extending portions of these arms. The inner ends of these governor arms are rounded and are of a size to ride between collars 46 and 47, fixedly secured to the governor stem 38. A spider cap member 50 is threadedly mounted in the upper end of the spider 41 to provide a bearing support for the ball bearing 48. This cap member is shown in Figure 4, but has been omitted from Figure 7 to more clearly illustrate the construction of the spider which supports the governor arms. The lower portion of the governor head 39 has a helical gear 51 fixedly secured thereto to have driven engagement with a worm gear 52. The worm gear 52 is fixedly mounted on a shaft 54, which shaft is pivotally mounted in a laterally disposed offset portion 53 of the casing 19. The ends of the shaft 54, not illustrated, are shaped on one end to have driven engagement with a speedometer cable 55 (see Figure 2). The other end of the shaft 54 is shaped to have driving engagement with a speedometer drive shaft 56, also not illustrated. The connections of the speedometer cable and speedometer drive shaft are well known to the art, and it is believed, therefore, unnecessary to illustrate them in detail. Although the governor is here shown as having driven connection from the speedometer cable, it is to be understood that the invention is not limited to this specific driving method, since the device can be readily attached to any rotating part of the vehicle or driving motor, as is well known to the art.

The casing 19 is provided with a port 57 on one side thereof, and a second port 58 on the opposite side and vertically offset from the port 57. The slidable valve piston 34 (see Figure 5) has a head portion 59 and a recessed central portion 60 and an enlarged lower portion 61. The portions 59 and 61 are of a size to have a slidable fit in the casing 19, but are fitted closely enough so that they form a fairly air-tight seal with the walls of the casing 19. The head portion 59 is of a height slightly less than the height of the port 58, and the recessed portion 60 is preferably of a height greater than the outside vertical distance between the top of the opening 58 and the bottom of the opening 57.

The foot throttle pedal 4 is pivotally mounted on a bracket 64 and has an upwardly extending arm 65 fixedly secured thereto. A coil spring 18 is mounted to engage the rear side of this arm 65 and resiliently force it forwardly thereby tending to rotate the arm 65 and the foot accelerator pedal in a counter-clockwise direction about their point of pivotal support. The foot accelerator pedal is shown in Figure 1 in partly depressed position.

A link 66 connects the arm 65 to the carburetor control arm 67, the arm 67 being in turn fixedly connected to the shaft 68 of an ordinary carburetor butterfly valve 69.

An arm 70 (see Figures 1, 2, 3, and 8) is pivotally mounted on the valve shaft 68 and has a lug 71 projecting laterally therefrom to engage the arm 67 and move this arm with the arm 70. A link 72 is connected to the arm 70 and to a hand throttle button 73 mounted in the instrument panel 7.

Suitable friction means, not illustrated, of a well known type are mounted in connection with the button 73, to retain the hand throttle in adjusted position.

*Operation*

Assuming that the automobile motor is stopped and it is desired to start the motor, both the throttle valve 69 and the throttle valve 29 will be closed. Also, since the speedometer cable is not rotating the weighted governor arms 42 and 43 will be at rest and the governor valve piston 34 will be held in the fully raised position by the compression spring 33. This fully raised position of the valve piston is indicated by the upper pair of dotted lines in Figure 5 and is designated "full acceleration" in Figure 5. The valve piston being in this raised position places the ports 57 and 58 in communication with each other by means of the recessed central portion 60 of the piston.

Upon cranking the motor by means of the starting impulse, regardless of the means employed for cranking, the pressure in the intake manifold is lowered, as is well known to those skilled in the art, and this lowering of pressure in the intake manifold reduces the pressure in the tube 16, the area surrounding the reduced central portion 60 of the piston 34, the tube 20, and the diaphragm chamber 21 above the diaphragm 26. Lowering the pressure above the diaphragm 26 permits the air at atmospheric pressure to which the lower face of the diaphragm 26 is exposed to raise the diaphragm 26 to the upper dotted line position of Figure 2, thereby raising the rod 24 to open the governor controlled throttle valve 29. This may take place during the cranking of the motor, or, if the car starts at once, immediately after the starting of the motor. The instant of this full opening of the governor controlled throttle valve is, of course, not material, but it is material that this governor controlled valve opens promptly and fully upon starting the motor, as this prevents any interference with the normal operation of the car until the adjusted speed is reached.

Assuming now that the motor is running and it is desired to start the car, the car is placed in gear and set in motion in the usual manner. Let us further assume that the adjusting screw 31 is screwed well up into the casing 19 to place a considerable amount of compression on the spring 33 and that it is desired to adjust the governor for a limit of speed of, let us say, forty-five miles an hour.

The car is speeded up by means of the foot throttle 4 in a well known manner until the desired speed of forty-five miles an hour is attained. The adjusting screw 31 is then manually rotated to unscrew it from the casing until the pressure on the spring 33 is reduced sufficiently to permit the centrifugal force of the weighted lower portions 44 and 45 of the governor arms 42 and 43 to force the stem 38 downwardly, moving the valve piston 34 with it until the upper enlarged portion 59 of the piston seals the lower edge of the port 58. When this occurs a slight slackening in the speed of the car will be noted. The hand throttle 73 may then be pulled all the way out or the foot throttle 4 pressed all the way down to fully open the butterfly valve 69. The final adjustment of the governor may then be made, screwing the adjusting screw into the casing to increase the adjusted speed and unscrewing it to decrease the adjusted speed of the automobile.

It will be noted especially in Figure 5 that the height of the upper enlarged portion 59 of the valve piston 34 is slightly less than the height of the port 58. By this means when the valve piston is in the "controlled speed" position, as indicated by the lower pairs of dotted lines in Figure 5, a small amount of air at atmospheric pressure is admitted to the port 58 above the portion 59 while at the same time a small amount of air is evacuated from the port 58 below the portion 59. If the speed of the car falls below the adjusted speed, the centrifugal force of the governor arms 42 and 43 will be reduced below the compressive force of the spring 33, and the piston 34 will be moved upward by the spring 33 to close the port 58 to atmospheric air and to increase the opening to the reduced pressure of the intake manifold, thereby further evacuating the diaphragm housing to open the butterfly valve 29 to speed up the motor until the centrifugal force of the governor arms again is equalized with the compressive force of the spring 33.

An increase of speed above the adjusted speed increases the centrifugal force of the governor arms to overcome the pressure of the spring 33, thereby forcing the piston 34 downward so that the portion 59 closes the port 58 to the low pressure central portion of the piston and increases the opening above the piston to admit air at atmospheric pressure to the diaphragm housing and permit the spring 27 to move the butterfly valve 29 toward a closed position. In actual use the action of the present invention is smooth and rapid, the automobile quickly accelerating to the adjusted speed and smoothly holding this speed even over rolling or hilly country, providing the grades are not so steep as to require the shifting of gears or the use of the brakes.

The present invention has an important though incidental function in that it prevents too rapid opening of the carburetor throat in accelerating rapidly from slow speed. All experienced drivers are familiar with the fact that if the throttle is suddenly opened when traveling at slow speed the motor usually will not take the acceleration smoothly and has a tendency to spit and miss. This is due to full opening of the throttle valve with a relatively slow flow of air through the carburetor which renders the Venturi action of the carburetor throat ineffective to supply the proper mixture. Such action is prevented by the present invention since a rise in intake manifold pressure is transmitted through the pipe 16, the governor, and pipe 20 to the upper side of the diaphragm housing 21 holding the governor controlled valve 29 against too full opening and thereby providing maximum effective acceleration.

If it is desired to set the governor at an adjusted point this may be accomplished by sealing the adjusting screw in adjusted position by the use of any well known sealing device, not illustrated, and, by covering the box-like bracket 22 with a cover plate, also not shown, sealed in place to prevent disconnecting the mechanism. The connections of the pipe 29 may also be sealed to avoid the possibility of one not desiring to use the governor of disconnecting this pipe from the casing 19 and connecting it directly to the intake manifold. Thus adjusted and sealed it is impossible to drive the car in excess of the adjusted speed.

Such a feature is often desired by fleet operators and might be ordered by law to avoid excessive speeding. The device is simple and positive in operation, quick and smooth in operation and capable of easy adjustment for any speed throughout the full speed range of the automobile.

I claim:

1. Carburetor control means of the class described, including a motor driven governor, fluid pressure actuated control means including a valve chamber, a contained valve element operated by the governor, ports in said valve chamber upon opposite sides of said valve connected to two sources of fluid at different pressures, said valve having a balanced position determined by said governor element at which no excess of either fluid is admitted to said fluid pressure actuated means, a spring element acting on said valve to hold said ports in balanced communication in an inactive position of the governor and to actuate said valve to cause an excess of fluid from one of the ports in the operation of said governor, and a valve passage communicable with atmospheric pressure on each side of the valve, for the purpose set forth.

2. Carburetor control means of the class described, including a motor driven governor, fluid pressure actuated control means including a valve chamber, a contained valve element connected to and operated by the governor, ports in said valve chamber upon opposite sides of said valve connected to two sources of fluid at different pressures, said valve having a balanced position determined by said governor element at which no excess of either fluid is admitted to said fluid pressure actuated means, a spring element acting on said valve to hold said ports in balanced communication in an inactive position of the governor and to actuate said valve to cause an excess of fluid from one of the ports in the operation of said governor, means for adjusting the spring element, and a valve passage communicable with atmospheric pressure on each side of the valve, all for the purpose set forth.

JOSEPH BELLIS.